United States Patent [19]
Hara

[11] Patent Number: 5,997,325
[45] Date of Patent: Dec. 7, 1999

[54] PUSH BUTTON FOR A CARD CONNECTOR AND THE CARD CONNECTOR USING THE SAME

[75] Inventor: Tomihisa Hara, Nagono, Japan

[73] Assignee: Hon Hai Precision Ind. Co., Ltd., Taipei Hsien, Taiwan

[21] Appl. No.: 09/218,778

[22] Filed: Dec. 22, 1998

[30] Foreign Application Priority Data

Jun. 25, 1998 [TW] Taiwan ................... 87210200

[51] Int. Cl.$^6$ .................................................. H01R 13/62
[52] U.S. Cl. ........................................... 439/159; 439/160
[58] Field of Search .................................. 439/159, 160, 439/152, 153, 154, 155, 157

[56] References Cited

U.S. PATENT DOCUMENTS 5,730,610  3/1998  Hsia et al. .............................. 439/160
5,825,616  10/1998  Howell et al. .......................... 439/155

*Primary Examiner*—Paula Bradley
*Assistant Examiner*—Tho Dac Ta
*Attorney, Agent, or Firm*—Wei Te Chung

[57] ABSTRACT

A push button for a connector having a push bar slidably retained in a channel structure formed on a longitudinal side of the connector. The push button comprises a linking receptacle having a body portion fixed to the push bar at a first face thereof and two tabs extending from a second face opposite the first face thereby defining a recess therebetween. A button device is partially and pivotably received in the recess of the linking receptacle by a pivot and includes a spring having a first end fixed therein and a second end pivotably engaged with the pivot.

12 Claims, 5 Drawing Sheets

PUSH BUTTON FOR A CARD CONNECTOR AND THE CARD CONNECTOR USING THE SAME

BACKGROUND OF THE INVENTION

1. Field of the Invention

The present invention relates to a push button for a card connector and the card connector using the same, and especially to a bendable push button which can assume either a bent status (retracted status) or a straight status for normal storage purposes or card ejection purposes, respectively.

2. The Prior Art

PCMCIA card connectors have become popular in portable computers. The card connectors are commonly configured with an ejector mechanism mounted on a frame and driven by a push button to disconnect and eject IC cards therefrom. However, the push button normally extends beyond the terminal end of the frame a considerable distance thereby occupying too much space and hindering the compact requirement of the connector.

For fulfilling the compact requirement, a bendable push button and a related connector are disclosed in Taiwan Patent No. 85103753 which is shown in FIGS. 6 and 7. The connector 9 comprises an ejector mechanism 91 having a push button 92 at the end thereof. The push button 92 has a linking block 93 and a button 94 pivotably engaged with the linking block 93. The linking block 93 comprises a body portion 93A, a lower plate 935 extending vertically from a bottom of the body portion 93A, and a rib 931 formed at an intermediate portion of the lower plate 935 thereby defining two cavities 932, 933 on opposite sides thereof. An elliptical hole 934 is defined through an intermediate portion of the rib 931 in communication with the cavities 932, 933. The button 94 has a body portion 94A and two tabs 942, 943 extending upward from a top surface of the body portion 94A thereby defining a reception space 941 therebetween. A pair of aligned holes 945, 946 are respectively defined in the tabs 942, 943. A recess 944 is defined in the body portion 94A of the button 94 for receiving a spring 95 and a ball 96, wherein the ball 96 has a greater diameter than the spring 95 thereby ensuring that the ball 96 is biased by the spring 95. The button 94 is pivotably connected to the linking block 93 by inserting a pivot 97 into the elliptical hole 934 of the linking block 93 and the aligned holes 945, 946 of the button 94, wherein the tabs 942, 943 are loosely retained in the cavities 932, 933 of the linking block 93 after the spring 95 and the ball 96 have been forced into the recess 944 by the bottom edge of the rib 931. At least a portion of the ball 96 extends beyond the recess 944 for rolling along the bottom edge and an adjacent side of the rib 931 during pivotable movement of the button 94 with respect to the linking block 93. The elliptical hole 934 provides clearance for the pivot 97 when the ball 96 rolls over a corner of the rib 931. Formation of the recess 944 is laborious thereby increasing manufacturing costs. Moreover, the pivot movement of the button 94 is not smooth when the ball 931 rolls over the corner of the rib 931. Additionally, fixing the ball in an opening of the recess 944 is very difficult due to a bouncing force from the spring 95.

Therefore, it is requisite to provide a new push button which is easily configured and has a reliable performance.

SUMMARY OF THE INVENTION

The primary purpose of the present invention is to provide a push button which has a simple structure and a reliable performance.

The second purpose of the present invention is to provide a push button which can be reliably retained in position either at a straight status or a bent (retracted) status.

In accordance with one aspect of the present invention, a push button for a connector having a push bar slidably retained in a channel structure formed on a longitudinal side thereof, comprises a linking receptacle having a body portion fixed to the push bar at a first face thereof and two tabs extending from a second face opposite the first face thereby defining a recess therebetween. Button means is partially and pivotably received in the recess of the linking receptacle by a pivot and includes a spring having a first end fixed therein and a second end pivotably engaged with the pivot.

In accordance with another aspect of the present invention, a card connector comprises an insulative header having a plurality of contacts partially received therein and partially extending therefrom, a pair of guiding arms extending from opposite ends of the header, each guiding arm defining an inner channel exposed toward each other for guiding a card to electrically connect with the contacts of the header, an ejection mechanism pivotably engaged with the header, a push bar linked with the ejection mechanism and slidably received in an outer channel formed on one of the guiding arms, and a push button engaged with the push bar and comprising a linking receptacle and button means pivotably engaged with the linking receptacle. The linking receptacle has a body portion fixed to the push bar at a first face thereof and two tabs extending from a second face opposite the first face thereby defining a recess therebetween. The button means is partially and pivotably received in the recess of the linking receptacle by a pivot. A spring has a first end fixed to the button means and a second end pivotably engaged with the pivot.

These and additional objectives, features, and advantages of the present invention will become apparent after reading the following detailed description of the preferred embodiment taken in conjunction with the appended drawing figures.

DETAILED DESCRIPTION OF THE PREFERRED EMBODIMENT

Figure 1:
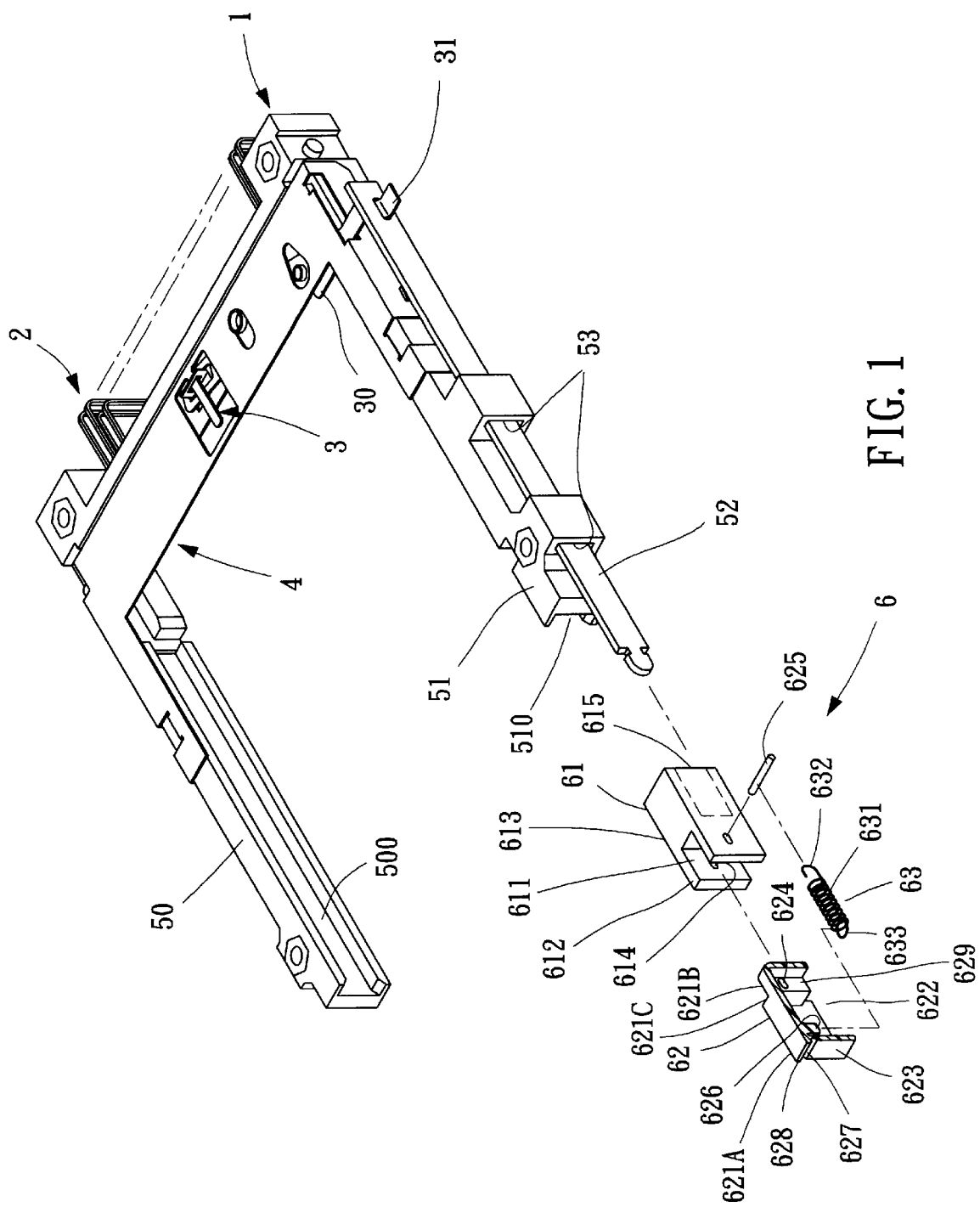
FIG. 1 is a partially exploded view of a connector in accordance with the present invention.
Figure 2:
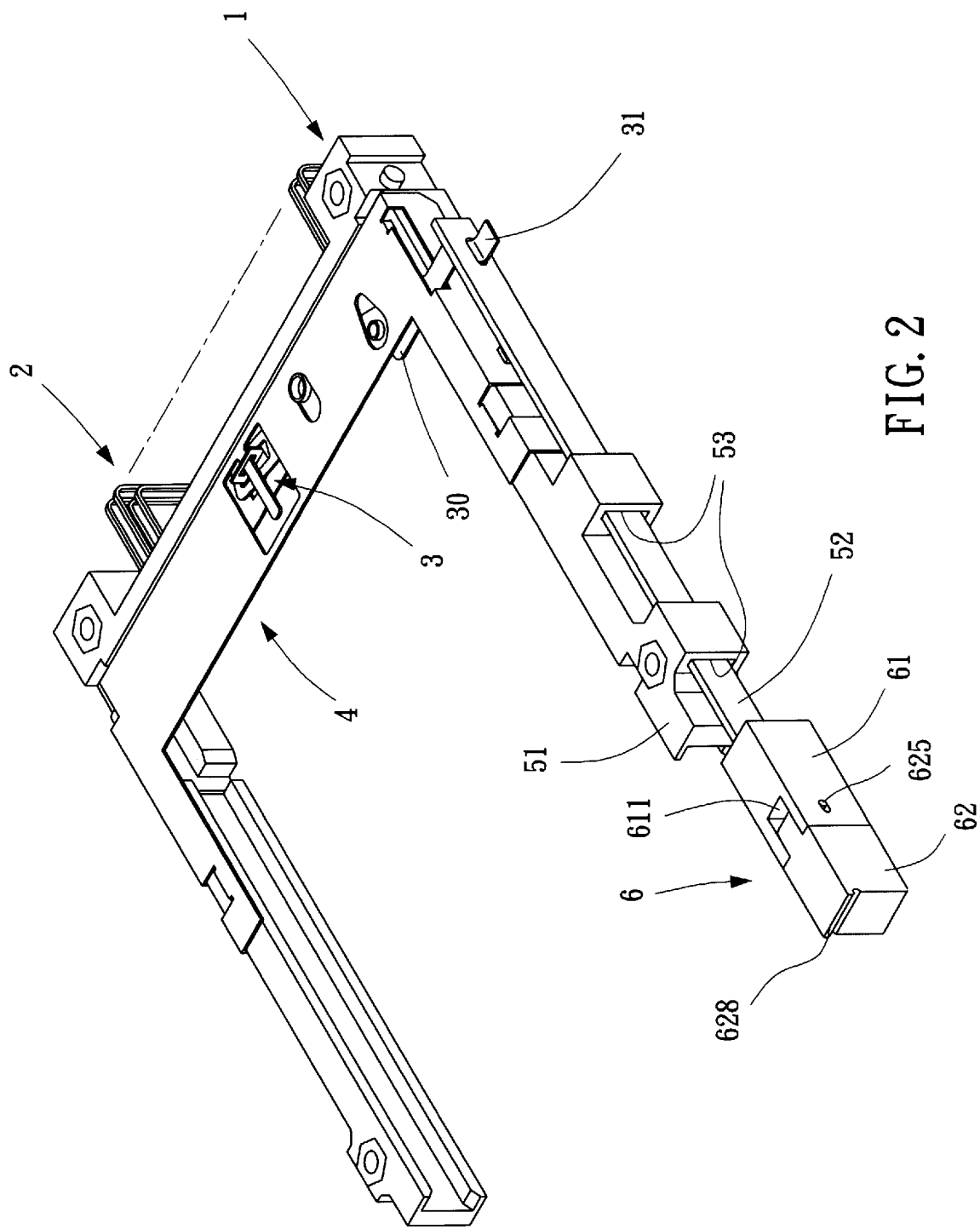
FIG. 2 is an assembled view of FIG. 1.

Referring to FIGS. 1 and 2, a card connector in accordance with the present invention comprises an insulative header 1 having a plurality of contacts 2 partially received therein and partially extending therefrom. A pair of guiding arms 50, 51 extend from opposite ends of the header 1 and each defines an inner channel 500, 510 exposed toward each other for guiding a card (not shown) to electrically connect with portions of the contacts 2 received in the header 1. An ejection mechanism 3 is pivotably engaged with the header 1 for ejecting the card out of the connector. The ejection mechanism 3 comprises a lever 30 having one end 31 engaged with a push bar 52 slidably received in an outer channel 53 of the guiding arm 51. Specifically, the outer channel 53 is defined by two aligned closures (not labeled) formed on an outer surface of the guiding arm 51. A metal cover 4 is mounted on the connector substantially covering portions of the ejection mechanism 3 and the guiding arms 50, 51.

A push button 6 is fixed to one end of the push bar 52 for receiving a force to push the push bar 52. The push bar 52 then drives the ejection mechanism 3 from the end 31 of the lever 30 to eject a card from the connector.

The push button 6 comprises a linking receptacle 61 and a button 62 partially and pivotably received in the linking receptacle 61 by a pivot 625. The linking receptacle 61 has a body portion 613 defining a slit 615 in a first face thereof for engaging with one end of the push bar 52. Two tabs 612 extend from a second face of the body portion 613 opposite the first face thereby defining a recess 611 therebetween. Two holes 614 are defined in the tabs 612 for receiving and supporting the pivot 625. The button 62 has a body portion 621A and a neck portion 621B integrally formed with the body portion 621A thereby defining a shoulder portion 621C therebetween. The neck portion 621B is sized to be loosely received in the recess 611 of the linking receptacle 61 whereby the shoulder portion 621C mates with edges of the tabs 612. A push portion 623 is formed on one face of the body portion 621A. A protruding edge 628 of the body portion 621A extends beyond the push portion 623 and a groove 627 is defined in the push portion 623 adjacent to the protruding edge 628. A force can easily be exerted on the push portion 623 due to the provision of the protruding edge 628 and the groove 627.

In FIG. 1, a portion of the button 62 is removed to show the internal configuration thereof. The button 62 defines a cavity 622 for receiving a spring 63. The spring 63 has a body portion 631, and a first hook 633 and a second hook 632 formed on opposite ends of the body portion 631. A beam 626 extends from an upper inner wall of the body portion 621A for engaging with the first hook 633 of the spring 63. The neck portion 621B of the button 62 is integrally formed with two spaced-apart blocks 629 (only one shown) proximate each other and each defining an elongate hole 624 for receiving a portion of the pivot 625 therein. Specifically, the holes 614 of the linking receptacle 61 align with the elongate holes 624 of the button 62 for receiving the pivot 625. The second hook 632 of the spring 63 is engaged with the pivot 625 and is pivotably moved with respect thereto. Specifically, the second hook 632 is loosely retained in a narrow space defined between the two blocks 629 thereby preventing the second hook 632 from lateral displacement when the button 62 is rotated with respect to the linking receptacle 61.

Figure 3:
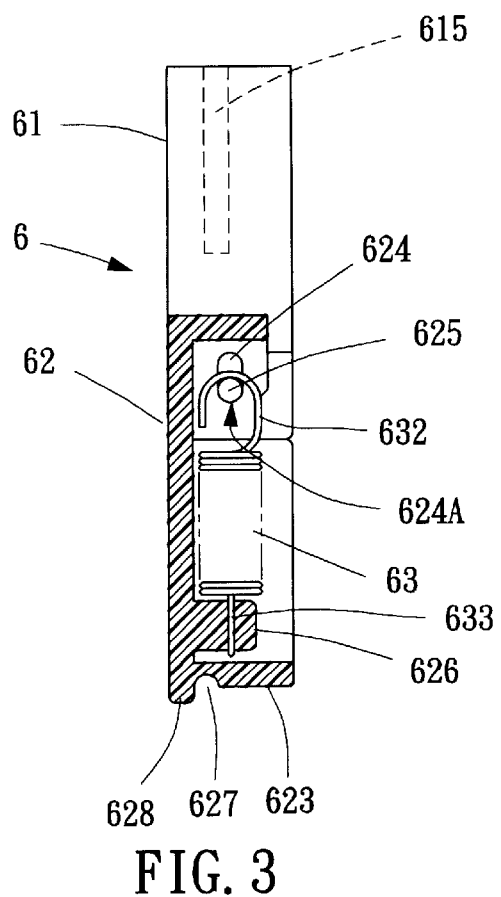
FIG. 3 is a cross-sectional view of the push button of FIG. 2 in a straight status.
Figure 4:
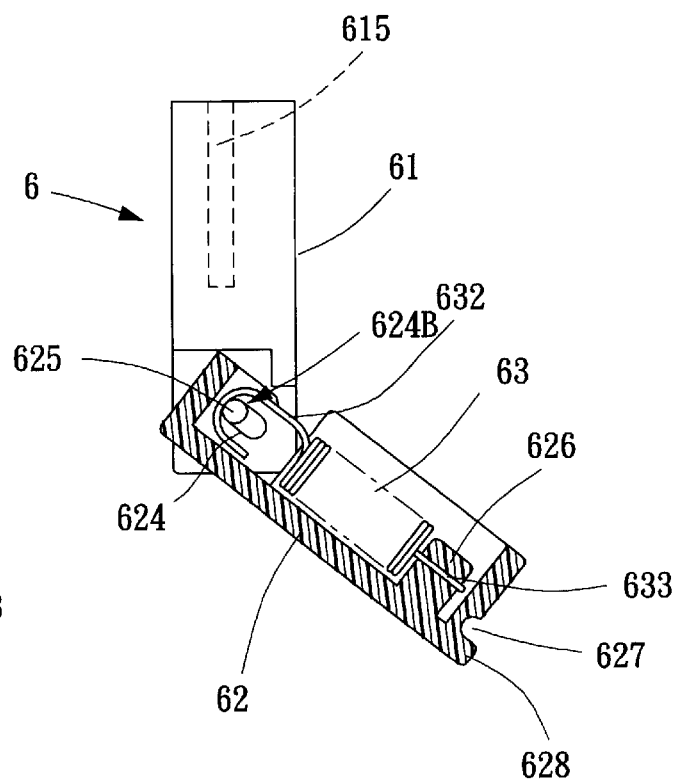
FIG. 4 is similar to FIG. 3 wherein the push button experiences a bending movement.
Figure 5:
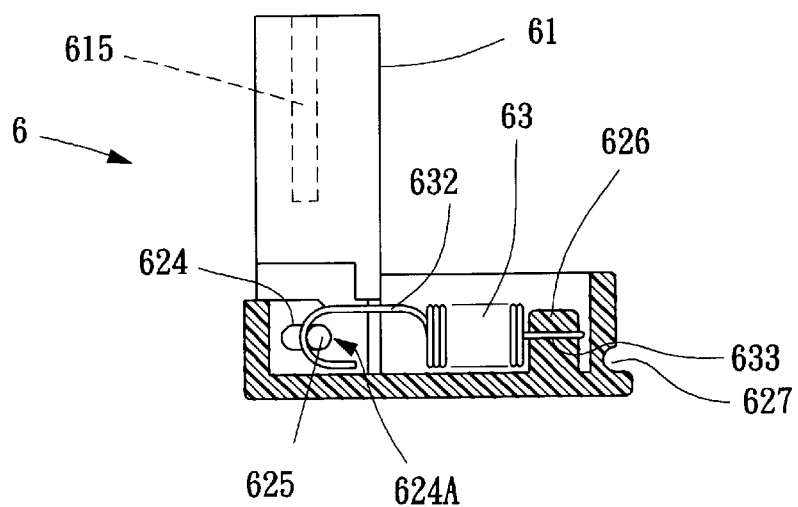
FIG. 5 is similar to FIG. 3 wherein the push button is at a retracted status.
Figure 6:
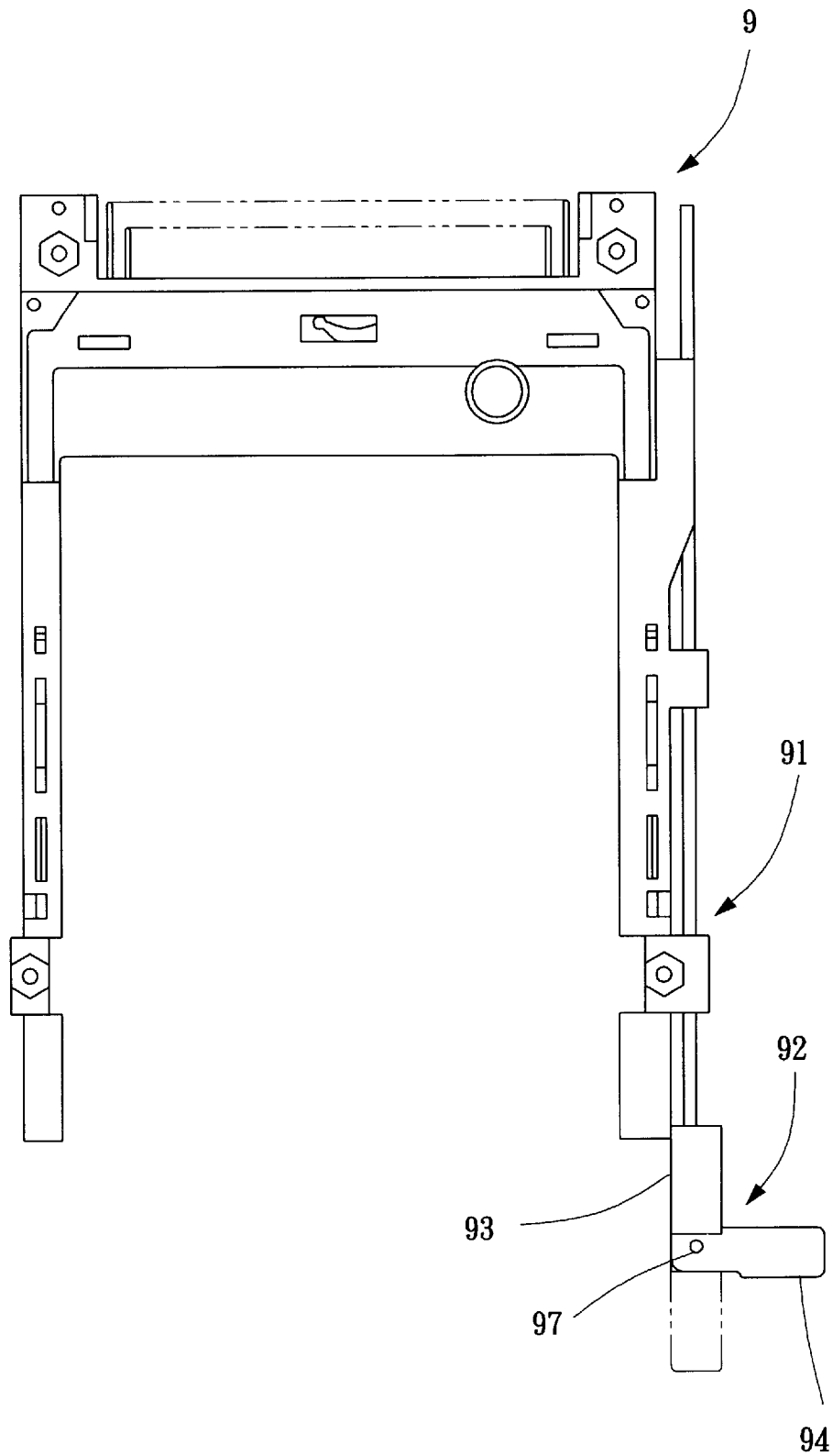
FIG. 6 is a conventional connector having a bendable push button.
Figure 7:
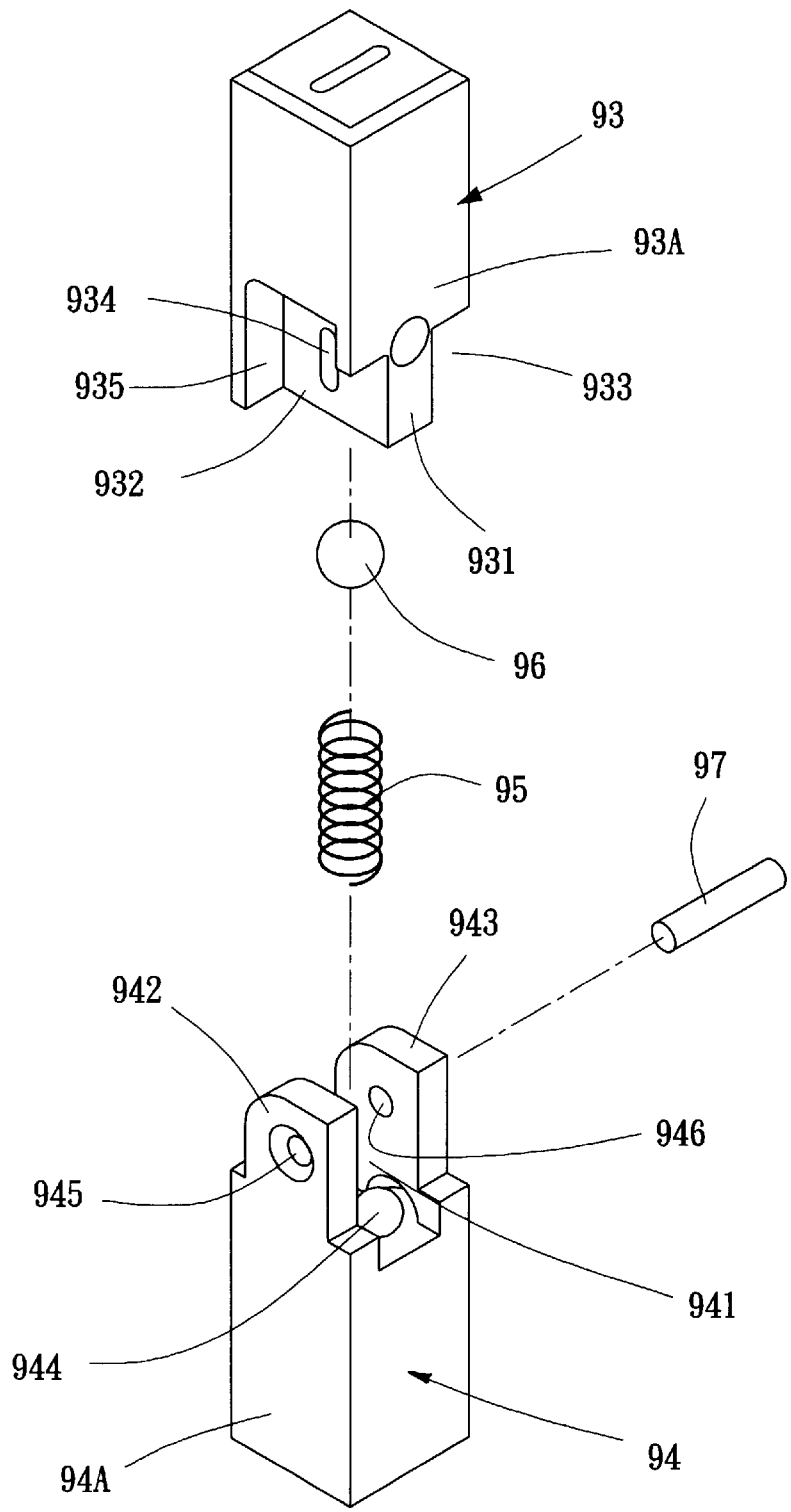
FIG. 7 is an exploded view of the push button of FIG. 6.

FIGS. 3, 4 and 5 illustrate the rotation and position of the button 62 with respect to the linking receptacle 61. FIG. 3 shows the push button 6 at a straight status ready to be pushed forward for ejecting an inserted card, wherein each elongate hole 624 of the button 62 has a first terminal periphery 624A abutting against the pivot 625 due to a tension force from the spring 63. After the card is ejected from the connector, the button 62 may be bent substantially 90 degrees whereby the push button 6 changes from the straight status to the retracted status shown in FIG. 5. During rotation of the button 62 with respect to the pivot 625, the relative position of the elongate hole 624 with respect to the pivot 625 is described as follows. When the button 62 rotates to 45 degrees, the elongate hole 624 will contact the pivot 625 initially at the first terminal periphery 624A and then at a second terminal periphery 624B as shown in FIG. 4. When the button 62 rotates from 45 degrees to 90 degrees, the elongate hole 624 will contact the pivot 625 at the second terminal periphery 624B and then at the first terminal periphery 624A. When the button 62 moves from the retracted status of FIG. 5 to the straight status of FIG. 3, the elongate hole 624 of the button 62 experiences a similar displacement about the pivot 625. Therefore, the button 62 may be fixed in place either parallel to or perpendicular to the linking receptacle 61 (FIGS. 3 and 5) due to the tension from the spring 63.

From the above description, it can be concluded that the push button of the present invention has a simple and reliable structure superior to the prior art.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

What is claimed is:

1. A card connector comprising an insulative header having a plurality of contacts partially received therein and partially extending therefrom, a pair of guiding arms extending from opposite ends of the header, each guiding arm defining an inner channel exposed toward each other guiding a card to electrically connect with the contacts the header, an ejection mechanism pivotably engaged with header, a push bar linked with the ejection mechanism slidably received in an outer channel formed on one of for of the and the guiding arms, and a push button engaged with the push bar and comprising a linking receptacle and button means pivotably engaged with the linking receptacle, the linking receptacle having a body portion fixed to the push bar on a first face thereof and two tabs extending from a second face opposite the first face thereby defining a recess therebetween;

wherein the button means is partially and pivotably received in the recess of the linking receptacle by a pivot, the button means includes a spring having a first end being fixed in the recess and a second end being pivotably held by the pivot.

2. The card connector as claimed in claim 1, wherein the first face of the linking receptacle defines a slit for retaining an end portion of the push bar.

3. The card connector as claimed in claim 1, wherein the button means comprises a housing defining a cavity for receiving the spring.

4. The card connector as claimed in claim 3, wherein the button means has a neck portion pivotably received in the recess of the linking receptacle and a shoulder portion mating with the tabs of the linking receptacle.

5. The card connector as claimed in claim 4, wherein the button means has a beam extending from an inner wall thereof for engaging with the first end of the spring.

6. The card connector as claimed in claim 5, wherein the first end of the spring is a hook structure engaging with the beam of the button means.

7. The card connector as claimed in claim 6, wherein the neck portion of the button means is integrally formed with two spaced-apart blocks proximate each other and each defining a hole for receiving a portion of the pivot therein.

8. The card connector as claimed in claim 7, wherein the second end of the spring is a hook structure partially retained between the two blocks and partially engaging with the pivot.

9. The card connector as claimed in claim 8, wherein the button means forms a surface opposite the neck portion and a protruding edge extends beyond the surface.

10. The card connector as claimed in claim 9, wherein the button means defines a groove in the surface adjacent to the protruding edge.

11. The card connector as claimed in claim 1, wherein each tab of the linking receptacle defines a hole aligned with each other for receiving the pivot therethrough.

12. The card connector as claimed in claim 11, wherein the hole defined in each tab of the linking receptacle is an elongate hole.

* * * * *